United States Patent
Dastol et al.

(10) Patent No.: US 6,696,035 B2
(45) Date of Patent: Feb. 24, 2004

(54) METHOD FOR PRODUCTION OF WHITE MICROSILICA

(75) Inventors: Magne Dastol, Kristiansand (NO); Halvard Tveit, Trondheim (NO); Eldar Dingsoyr, Sogne (NO); Per Ronning, Orkanger (NO); Svein Harsaker, Orkanger (NO)

(73) Assignee: Elkem ASA (NO)

( * ) Notice: Subject to any disclaimer, the term of this patent is extended or adjusted under 35 U.S.C. 154(b) by 399 days.

(21) Appl. No.: 09/898,869

(22) Filed: Jul. 3, 2001

(65) Prior Publication Data

US 2002/0025287 A1 Feb. 28, 2002

Related U.S. Application Data

(63) Continuation-in-part of application No. 08/586,678, filed as application No. PCT/NO94/00128 on Jul. 19, 1994, now abandoned.

(30) Foreign Application Priority Data

Jul. 27, 1993 (NO) ................................................ 932696

(51) Int. Cl.[7] .............................................. C01B 33/12
(52) U.S. Cl. ....................... 423/337; 423/335
(58) Field of Search ............................... 423/335, 336, 423/337

(56) References Cited

U.S. PATENT DOCUMENTS

| | | | | | |
|---|---|---|---|---|---|
| 3,622,295 A | * | 11/1971 | Loukes et al. | ............. | 65/30.13 |
| RE29,464 E | * | 11/1977 | Loukes et al. | ............. | 65/30.13 |
| 5,745,291 A | * | 4/1998 | Jenkinson | ................... | 359/586 |

* cited by examiner

*Primary Examiner*—Stanley S. Silverman
*Assistant Examiner*—Edward M. Johnson
(74) *Attorney, Agent, or Firm*—Muserlian Lucas and Mercanti

(57) ABSTRACT

The present invention relates to a method for producing microsilica having a reflectivity between 65 and 90% in a smelting furnace for production of ferrosilicon or silicon by using a charge comprising an $SiO_2$ source and a solid carbonaceous reduction agent, where microsilica is recovered from the off-gases from the smelting furnace, wherein the solid reduction agent supplied to the furnace contains an amount of volatile matters of less than 1.25 kg per kg produced microsilica and that the temperature in the gas atmosphere in the furnace above the charge is kept above 500° C.

8 Claims, 1 Drawing Sheet

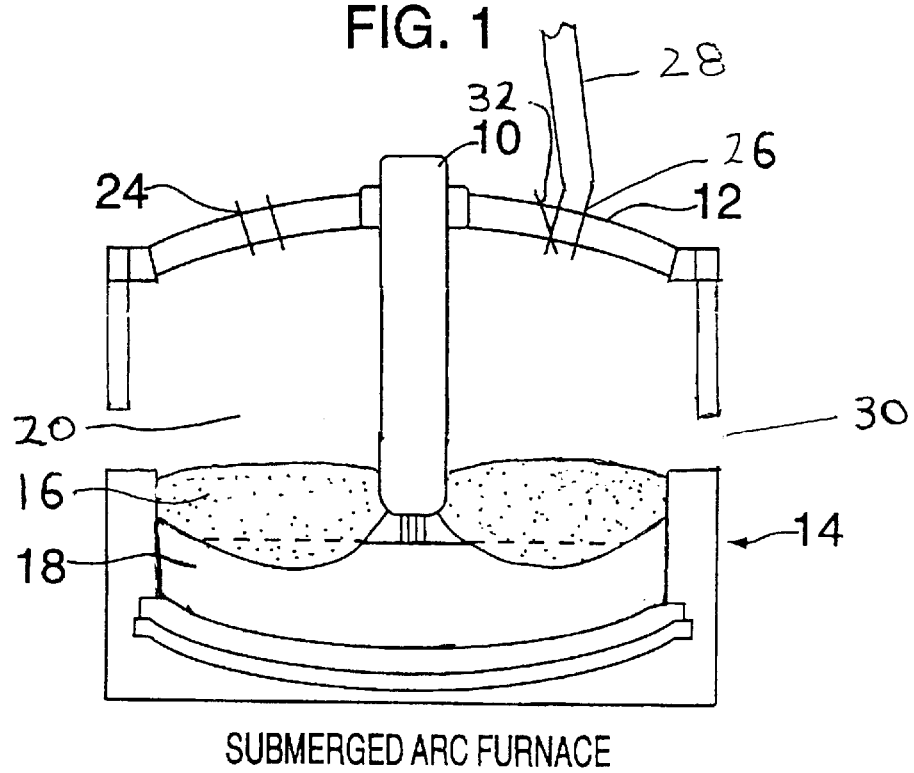

METHOD FOR PRODUCTION OF WHITE MICROSILICA

CROSS-REFERENCE TO RELATED APPLICATIONS

This application is a continuation-in-part of U.S. patent application No. 08/586,678 filed Jan. 30, 1996, which was the national phase (35 USC 371) of International Application No. PCT/NO94/00128 filed Jul. 19, 1994 now abandoned which in turn claimed the priority of Norwegian Patent Application No. 932696 filed Jul. 27, 1993.

TECHNICAL FIELD

The present invention relates to a method for production of microsilica having a high light reflectivity or whiteness.

BACKGROUND ART

Microsilica is normally produced as a by-product during production of ferrosilicon and silicon in electric reduction furnaces where a charge comprising a $SiO_2$ source and one or more solid carbonaceous reduction agents is reacted to form ferrosilicon or silicon. In this process, gaseous SiO is formed as an intermediate product in the reaction zone in the furnace and the gas moves upwards through the charge. A part of the SiO gas is condensed in the cooler charge above the reaction zone, while the remaining part of the SiO gas escapes from the charge, is quickly cooled and oxidized by air which is supplied to the furnace, above the charge, and forms particulate amorphous $SiO_2$. The particulate $SiO_2$ is carried upward out of the furnace in the off-gas and is recovered from the furnace off-gas in filters, normally baghouse filters. Microsilica produced in this way has a particle size substantially between 0.02 and 0.5 microns, and the individual particles are basically of spherical shape. Microsilica has during the last two decades found an increasing use as an additive material in concrete, refractory materials, ceramic materials, oil well cementing slurries, plastic materials, paper and others.

In production of ferrosilicon and silicon by the above mentioned method, the carbonaceous reduction agent normally comprises a mixture of about 65% by weight of coal with the remainder being coke and optionally wood chips. This mixture has been shown to give the best possible furnace operation as to productivity and yield of ferrosilicon and silicon.

Microsilica which is recovered by this method has a reflectivity between 30 and 50 measured by a method where black felt has a reflectivity of zero and where $BaSO_4$ has a reflectivity of 98.6. The produced microsilica thus has a relatively dark color, which is a problem where microsilica is intended for use in a white product. The microsilica has such a low reflectivity because the microsilica particles contain carbon in an amount of up to 3% by weight.

Table 1 shows the chemical composition and some other properties for microsilica produced by the conventional method in a furnace for production of 75% ferrosilicon.

TABLE 1

| Compound | % by weight |
| --- | --- |
| $SiO_2$ | 86–90 |
| SiC | 0.1–0.4 |
| $Fe_2O_3$ | 0.3–0.9 |
| TiO | 0.02–0.06 |

TABLE 1-continued

| Compound | % by weight |
| --- | --- |
| $Al_2O_3$ | 0.2–0.6 |
| MgO | 2.5–3.5 |
| CaO | 0.2–0.5 |
| $Na_2O$ | 0.9–1.8 |
| $K_2O$ | 2.5–3.5 |
| S | 0.2–0.4 |
| C | 0.8–2.0 |
| P | 0.03–0.08 |
| Ignition loss (1000° C.) | 2.4–4.0 |
| Bulk density, from filter, g/l | 200–300 |
| Bulk density, compacted, g/l | 500–700 |
| Real density, g/cm$^3$ | 2.20–2.25 |
| Specific surface m$^2$/g | 18–22 |
| Primary particle size, percentage < 1 μm | 90 |

Two methods have been proposed to solve the problem with microsilica having a low reflectivity. In one method, microsilica produced as a by-product in electric smelting furnaces for production of ferrosilicon and silicon is heat treated in a fluidized bed at temperatures of up to 900° C. in order to combust the carbon contained in the microsilica. This method is described in Japanese patent publication No. 11559/84. According to the other method, microsilica is produced in a so-called microsilica generator from a charge consisting of $SiO_2$ and Si. In this process a small part of silicon is produced in addition to microsilica. Both of these two methods have disadvantages. Heat treatment of microsilica in a fluidized bed implies an additional step which is very costly and which is difficult to control. Without a strict control of temperature and retention time, in the fluidized bed, a part of the amorphous $SiO_2$ particles will be converted to a crystalline state which will give a product with completely different properties. In addition, crystalline $SiO_2$ constitutes a health risk. Production of microsilica in a microsilica generator is very costly and it is difficult to design microsilica generators having a high capacity.

DISCLOSURE OF INVENTION

Thus, there is a need to provide a method for producing microsilica whereby the disadvantages of the prior art methods are overcome.

Accordingly, the present invention relates to a method for producing microsilica having a reflectivity between 65 and 90% in a smelting furnace for production of ferrosilicon or silicon by using a charge comprising an $SiO_2$ source and a solid carbonaceous reduction agent, where microsilica is recovered from the off-gases from the smelting furnace, comprises supplying a solid reduction agent to the furnace which contains an amount of volatile matters of less than 1.25 kg per kg produced microsilica; and keeping the temperature in the gas atmosphere in the furnace above 500° C.

This process is intended for use in an industrial size furnace which produces ferrosilicon or silicon on a commercial scale.

Keeping the temperature in the gas atmosphere in the furnace above 500° C. means that all of the atmosphere above the charge in the furnace is above 500° C. This means that the gas atmosphere at the top of the furnace is above 500° C. and that the temperature of the gas atmosphere directly above the charge is also above 500° C.

The amount of volatile matters in the solid reduction agent is preferably kept below 1.0 kg per kg produced microsilica, while the temperature in the gas atmosphere in the furnace is preferably above 600° C. For best results, the amount of volatile matters in the reducing agents is kept below 0.5 kg per kg produced microsilica.

It has surprisingly been found that the method of the present invention can produce microsilica having a very high reflectivity at the same time as maintaining the yield of ferrosilicon or silicon. Such is extremely important for commercial smelting furnaces.

Microsilica having a very high reflectivity can thus, according to the present invention, be produced by changing the ratio between coke and coal in the reduction agent mixture and by keeping the temperature of the gas atmosphere at the top of the furnace above 500° C.

As coal has a substantially higher content of volatile matters than coke, one will in practice reduce the amount of coal and increase the amount of coke in the reduction agent mixture. According to a particularly preferred embodiment the reduction agent consists completely of coke.

As one of skill in the art recognizes, the temperature in the reaction zone around the arc at the tip of the furnace electrode in silicon and ferrosilicon furnaces is around 2000° C. Thus the temperature of the gas around the arc is also around 2000° C. The gas generated in the reaction zone moves upwards through the furnace charge in a counter-current flow with the furnace charge. The hot gas preheats the furnace charge and is consequently cooled to a much lower temperature before it enters the space above the furnace charge. Typically, the temperature of the gas atmosphere at the top of the furnace is about 400° C. and below.

The filters which collect the particulate $SiO_2$ require that the off-gas have a temperature of around 250° C. or less, thus, it is conventional to supply air to the gas atmosphere above the charge in the furnace such that the temperature of the off-gas (gas atmosphere) at the top of the furnace is cooled to about 400° C. or below. The off-gas will during the transport from the furnace to the baghouse normally cool down to a temperature of not more than 250° C.

One suitable means for keeping the temperature of the gas atmosphere in the furnace and especially at the top of the furnace above 500° C. in accordance with the present invention is to reduce the amount of air which enters the furnace. By reducing or controlling the in-flow of air to the gas atmosphere in the furnace above the charge, the temperature of the off-gas (gas atmosphere) at the top of the furnace is prevented from cooling to below 500° C. before it leaves the furnace. Controlling the amount of air that enters the furnace is done in a conventional manner using conventional equipment.

In order to measure the temperature of the gas atmosphere, the temperature of the gaseous atmosphere at the top of the furnace is suitably monitored by measuring the temperature of the off-gas as it enters the outlet in the hood of the furnace where the off-gas exits the furnace and enters the pipes which transports the off-gas to the baghouse. Alternatively, the temperature of the gaseous atmosphere in the furnace is measured just below the hood itself.

The off-gas must be cooled, prior to the filter, to about 250° C. or below. This step can be accomplished in any conventional manner. For example, by increasing the distance travelled by the off-gas in the pipes that connect the furnace to the baghouse, or by inserting a conventional gas cooling apparatus in the off-gas pipe between the furnace and the baghouse.

By the present invention, microsilica is produced having a whiteness of up to 90 at the same time as the other properties of the produced microsilica are not changed and where the costs for production of microsilica is not substantially higher than in production of microsilica using a conventional reduction agent mixture.

BRIEF DESCRIPTION OF THE DRAWINGS

FIG. 1 illustrates a conventional commercial size submerged arc furnace used for production of silicon or ferrosilicon.

As shown in FIG. 1, the electrode or electrodes 10 extend through hood 12 of furnace 14 in a semi-closed furnace configuration, as shown in FIG. 1. Charge 16 sits on top and partly submerged in molten metal layer 18. The gaseous atmosphere above the charge is labelled 20. Charge 16 is added to furnace 14 through inlet 24 which is positioned in the furnace hood 12 while the off-gases leave the furnace through outlet 26 and pipes 28 connects to a baghouse (not shown). In the semi-closed furnace configuration of FIG. 1, there is gap 30 between hood 12 and the top of furnace 14 which allows large quantities of air to be drawn into the furnace. By reducing gap 30 the amount of air entering the furnace is reduced and hence the overall temperature in the gas atmosphere above the charge in the furnace is increased. Charge is added to the furnace through ports in the furnace hood and/or by mechanical charging equipment. The furnace can be designed and operated in alternating current mode with one or more top electrodes, or in a direct current mode, typically with one top electrode and one bottom contact. Molten metal layer 18 is tapped continuously or intermittently from furnace 14 in a conventional manner using a tap hole not shown in FIG. 1.

The temperature of the gas atmosphere at the top of the furnace is suitably measured by thermocouple 32 or some other conventional temperature measuring device positioned at outlet 26.

The distance between the top of the charge 16 and the bottom of hood 12 varies and is typically between about 3 to about 5 meters.

These and other aspects of the present invention may be more fully understood by reference to one or more of the following examples.

EXAMPLE 1

In a 43 MW electric smelting furnace of circular cross-section and equipped with three self-baking carbon electrodes, 75% FeSi was produced using a charge consisting of quartzite as $SiO_2$ source and 100% coke as reduction agent. The coke had a content of volatile matter of 5.2% by weight.

The charge was supplied to the furnace in an amount of 18.27 tons per hour and from the smelting furnace 5.67 tons of 75% FeSi was tapped per hour, while from the furnace off-gases 0.81 tons of microsilica was recovered per hour. The temperature at the top of the furnace was kept constant at 700° C., in other words, the whole atmosphere above the charge was 700° C. and above. The power consumption per ton produced ferrosilicon was 7.7 Mwh.

The ratio between the amount of volatile matter in the reduction agent per kg produced microsilica was 0.27.

Samples of the produced microsilica were drawn at intervals during the furnace operation and the whiteness or reflectivity was measured using a Zeiss Erephomet D145 apparatus. The results showed that the produced microsilica had a whiteness which varied between 80 and 84.

EXAMPLE 2

In the same smelting furnace as used in Example 1, 75% FeSi was produced using a charge consisting of quartzite as SiO$_2$ source and a reduction agent mixture consisting of 80% by weight of coke having a content of volatile matter of 5.2% by weight, and 20% by weight of coal having a content of volatile matter of 33.8% by weight.

The charge was added to the furnace in an amount of 16.32 tons per hour and from the smelting furnace 5.40 tons of 75% FeSi was tapped per hour, while 0.56 tons per hour of microsilica was recovered from the furnace off-gases. The temperature in the furnace gas atmosphere at the top of the furnace was kept constant at 700° C., thus the complete gas atmosphere in the furnace was 700° C. and above.

The power consumption per ton produced ferrosilicon was 7.5 Mwh. The ratio between the amount of volatile matter in the reduction agents and kg produced microsilica was 1.00.

Samples of the produced microsilica were drawn at intervals during the furnace operation and the reflectivity was measured in the same way as described in Example 1. The results showed that the produced microsilica had a reflectivity between 67 and 76.

EXAMPLE 3 (Comparison)

For comparison purposes the furnace was operated using a conventional reduction agent mixture consisting of 65% by weight of coal and 35% by weight of coke. The ratio between volatile matter in the reduction agent mixture and the amount of produced microsilica was 1.90. The temperature at the top of the furnace was also in this example kept at 700° C. The production of 75% FeSi per hour was the same as in Examples 1 and 2 and the power consumption per ton produced ferrosilicon was 7.7 Mwh.

Samples of the produced microsilica were drawn at intervals and the reflectivity was measured. The results showed that the produced microsilica had a reflectivity of 40.

A comparison of the results in Examples 1 and 2 and the results in Example 3 shows that by the method of the present invention a substantial increase in whiteness of the produced microsilica is obtained at the same time as the power consumption and the yield of FeSi is not affected. This is very surprising as the production of microsilica having a high reflectivity always has been associated with a reduced yield of FeSi and an increased power consumption per ton of produced ferrosilicon.

What is claimed is:

1. A method for producing a microsilica having a high reflectivity in a smelting furnace having a hood mounted on top of said furnace in conjunction with the production of a silicon or ferrosilicon in said smelting furnace, said method comprising the steps of:
   (a) charging to a smelting furnace a charge comprising a SiO$_2$ source and a solid carbonaceous reduction agent, wherein said solid carbonaceous reduction agent contains an amount of volatile matter of less than about 1.25% kg per kg of microsilica produced;
   (b) producing a silicon or ferrosilicon and an off-gas in said furnace from said charge, said off-gas containing microsilica and said furnace having a gaseous atmosphere above said charge during production of said silicon and ferrosilicon;
   (c) maintaining said gaseous atmosphere at the top of said furnace at a temperature above about 500° C. to produce a microsilica having a reflectivity between about 65 and about 90%; and
   (d) recovering from said off-gas said microsilica having a reflectivity between about 65 and about 90%.

2. The method according to claim 1 wherein the amount of volatile matters in the solid reduction agent is kept below 1.0 kg per kg produced microsilica.

3. The method according to claim 2 wherein the reduction agent is coke.

4. The method according to claim 2 wherein the temperature in the gas atmosphere at the top of the furnace is maintained above 600° C.

5. The method according to claim 4 wherein the reduction agent is coke.

6. The method according to claim 1 wherein the temperature in the gas atmosphere at the top of the furnace is maintained above 600° C.

7. The method according to claim 6 wherein the reduction agent is coke.

8. The method according to claim 1 wherein the reduction agent is coke.

* * * * *